J. W. Prendergast,
Water Elevator.
No. 95,512.      Patented Oct. 5, 1869.
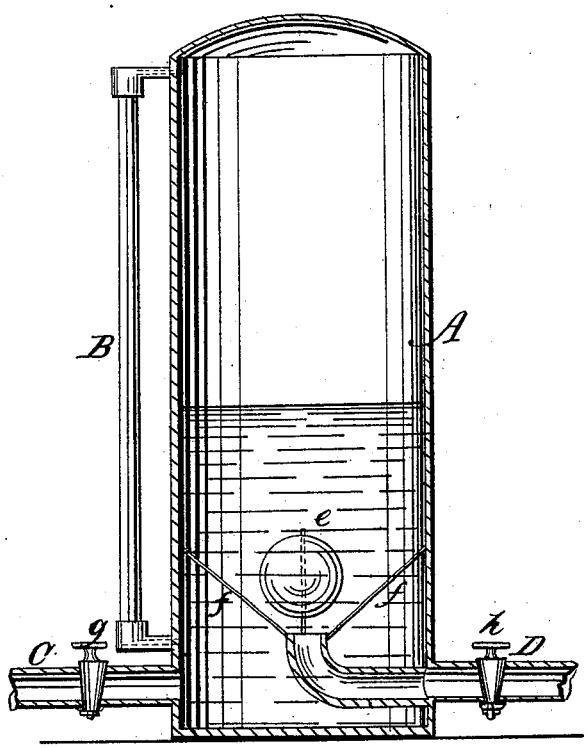
Witnesses.
A. W. Almqvist
John F. Brooks
Inventor.
J. W. Prendergast
per Munn & Co
Attorneys

United States Patent Office.

JAMES W. PRENDERGAST, OF NEW YORK, N. Y.

Letters Patent No. 95,512, dated October 5, 1869.

IMPROVEMENT IN AIR-PRESSURE WATER-RESERVOIRS.

The Schedule referred to in these Letters Patent and making part of the same.

*To all whom it may concern:*

Be it known that I, JAMES W. PRENDERGAST, of New York city, in the county and State of New York, have invented a new and useful Improvement in Apparatus for Raising Water; and I do hereby declare that the following is a full, clear, and exact description thereof, which will enable others skilled in the art to make and use the same, reference being had to the accompanying drawing, forming part of this specification.

This invention relates to a new and useful method of raising water, and consists in forcing the water into a vertical cylinder, provided with a ball-valve, a transparent gauge-tube, and suitable admission and discharge-pipes, as will be hereinafter more fully described.

The accompanying drawing represents a water and air-tight cylinder, constructed and arranged according to my invention.

A is the cylinder, which is made air-tight, of any required height and diameter, and sufficiently strong to sustain a pressure of, say, two hundred pounds to the square inch.

B represents a glass tube, which is in communication with both the upper and the lower ends of the cylinder, so that the height of the water in the cylinder may at all times be indicated.

C is the pipe, through which the water is admitted.

D is the discharge-pipe.

The latter pipe enters the cylinder, and turns up, forming an elbow therein, with a floating valve, $e$, in the cylinder, for stopping the flow of water from the discharge-pipe, and preventing the escape of the confined air, when the water descends to a certain point.

The valve is guided to its seat on the pipe by inclined rods or wires $f\,f$, as seen in the drawing.

$g$ and $h$ represent stop-cocks in the pipes C and D.

In the use of this apparatus, it is designed to have a pressure of air of from five to ten pounds in the cylinder, at all times; consequently, air, instead of water, is at first pumped in until that pressure is obtained, when water is forced in, and the air compressed to any required degree, for carrying water to any portion of the building, for domestic use, extinguishing fires, or for other purposes.

The cylinder may be of sufficient capacity for a day or a week's supply of water, and may be placed in any part of the building, and afford all the advantages (as regards a "head of water") of the most approved "water-works."

The advantages of this arrangement for country-residences, and for all situations where water is not supplied from the public reservoir, (and in many situations where it is,) are many, and must be obvious to all.

I claim as new, and desire to secure by Letters Patent—

The cylinder A, gauge-tube B, and ball-valve $e$, together with admission and discharge-pipes C D, combined and arranged substantially as and for the purpose herein shown and described.

The above specification of my invention signed by me, this 10th day of February, 1869.

JAMES W. PRENDERGAST.

Witnesses:
FRANK BLOCKLEY,
E. GREENE COLLINS.